Patented Dec. 10, 1935

2,023,768

UNITED STATES PATENT OFFICE 2,023,768

DERIVATIVES FROM DRYING OILS

Karl Ott, Leverkusen-on-the-Rhine, Herbert Gensel, Cologne-Mulheim, and Heribert Schüssler, Cologne-Deutz, Germany, assignors to I. G. Farbenindustrie Aktiengesellschaft, Frankfort-on-the-Main, Germany No Drawing. Application September 22, 1931, Serial No. 564,476. In Germany October 13, 1930

13 Claims. (Cl. 87—12)

The present invention relates to new derivatives from drying oils, more particularly it relates to products obtainable by the simultaneous action of a water-soluble salt of sulfurous acid and of an oxidizing agent upon drying oils.

As starting drying oils suitable for the purpose of the invention there may be used by way of example linseed oil, train oil, wood oil and poppy seed oil.

The new products are obtainable by causing a water-soluble salt of sulfurous acid, especially an alkali metal salt, to react upon a drying oil in the presence of an oxidizing agent and at an elevated temperature, say at temperatures between about 50 and 100° C. and the reaction is complete when a test portion taken is soluble in water. As oxidizing agents there can favorably be used air or oxygen, and a preferred method of carrying out our process consists in heating a drying oil with the addition of an aqueous bisulfite solution with strongly stirring the reaction mass. If desired, the process may be carried out with the addition of a catalyst of the kind generally known as drying catalysts for drying oils, such as cobalt- lead- manganese-naphthenate etc.

The new products in which the bulk of the sulfur is bound in form of sulfur atoms as present in a sulfurous acid ester are generally colorless or weakly colored oils, soluble in water with a small opalescence and are valuable sizing agents for textile yarns, particularly for natural and artificial silk.

The following example will illustrate this invention but without limiting it thereto. The parts are by weight.

*Example.*—100 parts of linseed oil are oxidized together with 100 parts of sodium bisulfite of 38° Bé. with air at a temperature of about 60 to 90° C. in a vessel being in a horizontal position and being provided with a horizontal stirrer and a fast running trowel. The reaction is finished when a test portion taken therefrom completely dissolves in water, that is to say, with a small opalescence without separation of oil. The mass is cooled and the oil is centrifuged from any separated Glauber's salt.

Viscose or acetate silk is treated with a solution of the sulfitated oxidized linseed oil, thus obtainable, for some minutes at the usual temperature, the silk is centrifuged or squeezed off, shaken out and dried at a low temperature. An artificial silk is obtained thereby, the fiber of which is excellently closed but which nevertheless is very soft and flexible. It can be freed from the size by means of a treatment with water of 70 to 80° C. in the usual manner without further additions.

We claim:

1. The products obtainable by reacting upon a drying oil with a water-soluble sulfurous acid salt in the presence of a gaseous oxidizing agent until water soluble products are obtained, said products being colorless or weakly colored oils.

2. The products obtainable by reacting upon a drying oil with an alkali metal salt of sulfurous acid in the presence of a gaseous oxidizing agent until water soluble products are obtained, said products being colorless or weakly colored oils.

3. The products obtainable by reacting upon a drying oil with sodium bisulfite in the presence of a gaseous oxidizing agent until water soluble products are obtained, said products being colorless or weakly colored oils.

4. The products obtainable by reacting upon a drying oil with an alkali metal salt of sulfurous acid in the presence of air until water soluble products are obtained, said products being colorless or weakly colored oils.

5. The products obtainable by reacting upon a drying oil with sodium bisulfite in the presence of air until water soluble products are obtained, said products being colorless or weakly colored oils.

6. The products obtainable by reacting upon linseed oil with a water-soluble sulfurous acid salt in the presence of a gaseous oxidizing agent until water soluble products are obtained, said products being colorless or weakly colored oils.

7. The products obtainable by reacting upon linseed oil with an alkali metal salt of sulfurous acid in the presence of a gaseous oxidizing agent until water soluble products are obtained, said products being colorless or weakly colored oils.

8. The products obtainable by reacting upon linseed oil with sodium bisulfite in the presence of a gaseous oxidizing agent until water soluble products are obtained, said products being colorless or weakly colored oils.

9. The products obtainable by reacting upon linseed oil with an alkali metal salt of sulfurous acid in the presence of air until water soluble products are obtained, said products being colorless or weakly colored oils.

10. The product obtainable by reacting upon linseed oil with sodium bisulfite in the presence of air until water soluble products are obtained, said product being a colorless or weakly colored oil.

11. The process which comprises reacting upon a drying oil with a water-soluble sulfurous acid salt in the presence of a gaseous oxidizing agent until a water-soluble product is obtained.

12. The process which comprises reacting upon a drying oil with an alkali metal salt of sulfurous acid in the presence of a gaseous oxidizing agent until a water-soluble product is obtained.

13. The process which comprises reacting upon linseed oil with sodium bisulfite in the presence of air until a water-soluble product is obtained.

KARL OTT.
HERBERT GENSEL.
HERIBERT SCHÜSSLER.